US011954611B2

(12) United States Patent
Kollias et al.

(10) Patent No.: US 11,954,611 B2
(45) Date of Patent: Apr. 9, 2024

(54) TENSOR COMPARISON ACROSS A DISTRIBUTED MACHINE LEARNING ENVIRONMENT

(71) Applicant: International Business Machines Corporation, Armonk, NY (US)

(72) Inventors: Georgios Kollias, White Plains, NY (US); Theodoros Salonidis, Wayne, PA (US); Shiqiang Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 17/004,060

(22) Filed: Aug. 27, 2020

(65) Prior Publication Data

US 2022/0067543 A1    Mar. 3, 2022

(51) Int. Cl.
*G06N 20/00* (2019.01)
*G06N 5/04* (2023.01)
*G06N 20/20* (2019.01)

(52) U.S. Cl.
CPC ............... *G06N 5/04* (2013.01); *G06N 20/00* (2019.01); *G06N 20/20* (2019.01)

(58) Field of Classification Search
None
See application file for complete search history.

(56) References Cited

U.S. PATENT DOCUMENTS

| 8,027,938 | B1 | 9/2011 | Xu |
| 11,355,102 | B1* | 6/2022 | Mishchenko ......... G10L 15/063 |
| 2019/0050743 | A1 | 2/2019 | Chen |
| 2019/0079898 | A1 | 3/2019 | Xiong |
| 2020/0050951 | A1 | 2/2020 | Wang |
| 2020/0111030 | A1 | 4/2020 | Starosta |
| 2020/0117993 | A1 | 4/2020 | Martinez-Canales et al. |
| 2020/0293905 | A1 | 9/2020 | Huang |
| 2020/0388273 | A1* | 12/2020 | Fu ........................... G10L 15/18 |

FOREIGN PATENT DOCUMENTS

| CN | 105956021 B | 9/2016 |
| CN | 109447274 A | 3/2019 |
| CN | 109902186 A | 6/2019 |
| CN | 110958187 A | 4/2020 |

(Continued)

OTHER PUBLICATIONS

International Search Report and Written Opinion from International Application No. PCT/CN2021/114535 dated Nov. 24, 2021.

(Continued)

*Primary Examiner* — Xuyang Xia
(74) *Attorney, Agent, or Firm* — David K. Mattheis (57) ABSTRACT

Tensor comparison across a network by determining a first parameter of a first vector representation of a first tensor object associated with a first processor, receiving a second parameter associated with a second vector representation of a second tensor object associated with a second processor, determining a first difference between the first parameter and the second parameter, and sending the first vector representation from the first processor to the second processor, according to the first difference.

20 Claims, 6 Drawing Sheets

(56) References Cited

FOREIGN PATENT DOCUMENTS

| CN | 111340182 A | 6/2020 |
| CN | 111580827 A | 8/2020 |
| CN | 116113962 A | 5/2023 |
| DE | 112021004483 T5 | 7/2023 |
| GB | 2613316 A | 5/2023 |

OTHER PUBLICATIONS

"Byte catching", Fortinet, retrieved from the Internet on Jun. 2, 2020, 2 pages.

"IEEE 802.11 RTS/CTS", Wikipedia, This page was last edited on Feb. 6, 2020, 3 pages, <https://en.wikipedia.org/wiki/IEEE_802.11_RTS/CTS>.

"MPI Performance Topics", Last Modified: May 4, 2020, 32 pages, <https://computing.llnl.gov/tutorials/mpi_performance/>.

Achlioptas, Dimitris, "Database-friendly Random Projections", PODS '01 Santa Barbara, California, USA, © 2001 ACM 1-58113-361-8/01/05, pp. 274-281.

Ailon et al., "Approximate Nearest Neighbors and the Fast Johnson-Lindenstrauss Transform", STOC'06, May 21-23, 2006, Seattle, Washington, USA, Copyright 2006, ACM 1-59593-134-1/06/0005, pp. 557-563.

Alistarh et al., "QSGD: Communication-Efficient SGD via Gradient Quantization and Encoding", 31st Conference on Neural Information Processing Systems (NIPS 2017), Long Beach, CA, USA, 12 pages.

Charikar, Moses S., "Similarity Estimation Techniques from Rounding Algorithms", STOC'02, May 19-21, 2002, Montreal, Quebec, Canada, Copyright 2002, ACM 1-58113-495-9/02/0005, pp. 380-388.

Clarkson et al., "Low-Rank Approximation and Regression in Input Sparsity Time", Journal of the ACM, vol. 63, No. 6, Article 54, Publication date: Jan. 2017, 45 pages.

Datar et al., "Locality-Sensitive Hashing Scheme Based on p. Stable Distributions", SCG'04, Jun. 9-11, 2004, Brooklyn, New York, USA, Copyright 2004, ACM 1-58113-885-7/04/0006, pp. 253-262.

El Gamal et al., "On Randomized Distributed Coordinate Descent with Quantized Updates", downloaded from IEEE Xplore on Jun. 2, 2020, 5 pages.

Gionis et al., "Similarity Search in High Dimensions via Hashing", Proceedings of the 25th VLDB Conference, Edinburg, Scotland, 1999, pp. 518-529.

Golovin et al., "Large-Scale Learning with Less RAM via Randomization", Proceedings of the 30th International Conference on Machine Learning, Atlanta, Georgia, USA, 2013, JMLR: W&CP vol. 28, 9 pages.

Indyk et al., Approximate Nearest Neighbors: Towards Removing the Curse of Dimensionality, SIOC 98, Dallas, Texas, USA, pp. 604-613.

Jiang et al., "On Lightweight Privacy-Preserving Collaborative Learning for Internet-of-Things Objects", IoTDI '19, Apr. 15-18, 2019, Montreal, QC, Canada, © 2019 Association for Computing Machinery, 13 pages, <https://doi.org/10.1145/3302505.3310070>.

Konecny et al., "Federated Learning: Strategies for Improving Communication Efficiency", arXiv:1610.05492v2 [cs.LG] Oct. 30, 2017, 10 pages.

Konecny, et al., "Randomized Distributed Mean Estimation: Accuracy vs. Communication", Frontiers in Applied Mathematics and Statistics, Original Research published: Dec. 18, 2018 doi: 10.3389/fams.2018.00062, 11 pages.

Li et al., "A Survey on Federated Learning Systems: Vision, Hype and Reality for Data Privacy and Protection", arXiv:1907.09693v4 [cs.LG] Apr. 1, 2020, 41 pages.

Li et al., "Very Sparse Random Projections", Research Track Paper, KDD'06, Aug. 20-23, 2006, Philadelphia, Pennsylvania, USA, Copyright 2006 ACM 1-59593-339-5/06/0008, pp. 287-296.

Liu et al., "Random Projection-Based Multiplicative Data Perturbation for Privacy Preserving Distributed Data Mining", IEEE Transactions on Knowledge and Data Engineering, vol. 18, No. 1, Jan. 2006, pp. 92-106.

Mell et al., "The NIST Definition of Cloud Computing", Recommendations of the National Institute of Standards and Technology, Special Publication 800-145, Sep. 2011, 7 pages.

Rabbat et al., "Quantized Incremental Algorithms for Distributed Optimization", IEEE Journal on Selected Areas in Communications, vol. 23, No. 4, Apr. 2005, pp. 798-808, Digital Object Identifier 10.1109/USAC.2005.843546.

Suresh et al., "Distributed Mean Estimation with Limited Communication", Proceedings of the 34th International Conference on Machine Learning, Sydney, Australia, PMLR 70, 2017, 9 pages.

Wojcik et al., "Training neural networks on high-dimensional data using random projection", Pattern Analysis and Applications (2019) 22, pp. 1221-1231, Received: Nov. 30, 2016 / Accepted: Mar. 9, 2018 / Published online: Mar. 19, 2018, <https://doi.org/10.1007/s10044-018-0697-0>.

\* cited by examiner

TENSOR COMPARISON ACROSS A DISTRIBUTED MACHINE LEARNING ENVIRONMENT

BACKGROUND

The disclosure relates generally to tensor comparisons across a distributed computing environment. The disclosure relates particularly to sharing tensors across a distributed network environment according to tensor similarities.

Training big models over large datasets, e.g., the Turing-NLG, a 17-billion-parameter language model, utilizes distributed machine learning (DML). Such applications require the iterative transmission of large tensor objects between remotely distributed processes. Techniques exist to compress and decompress the tensors sent between the processes. Sending large tensor objects between processors across a networked computing environment can consume large quantities of communication resources.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable tensor comparisons and communications associated with tensor similarities.

Aspects of the invention disclose methods, systems and computer readable media associated with tensor comparison across a network by determining a first parameter of a first vector representation of a first tensor object associated with a first processor, receiving a second parameter associated with a second vector representation of a second tensor object associated with a second processor, determining a first difference between the first parameter and the second parameter, and sending the first vector representation from the first processor to the second processor, according to the first difference. By exchanging and comparing the vector parameters (lengths and angles), the processes are able to determine whether or not the original tensors are (approximately) similar, and the sender can decide on whether or not to send its tensor to the receiver. Sending tensors only as necessary—only when the tensors are not approximately similar—conserves communication resources.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of a system can employ hardware and/or software to solve problems that are highly technical in nature (e.g., determining a parameter of a vector representation of a first tensor, receiving a parameter value associated with a vector representation of a second tensor, determining a difference between the parameters, sending the first vector representation according to the difference, etc.). These solutions are not abstract and cannot be performed as a set of mental acts by a human due to the processing capabilities needed to facilitate tensor comparison across a network, for example. Further, some of the processes performed may be performed by a specialized computer for carrying out defined tasks related to distributed communications. For example, a specialized computer can be employed to carry out tasks related to managing network communication resource use by comparing tensor values across a network or the like.

The use of compression and decompression techniques may reduce the communications burden for transmitting large tensor entities across networks during DML training and use. Compression and decompression techniques still require the communication of large data entities. Compression/decompression cycles may not be necessary in every iteration of one or more processes as the processes may store tensors that are considered similar enough for application requirements (for example, convergence criteria). In such cases, communication and computation resources are wasted in the compression, communication and decompression of the tensors. In addition, in certain distributed applications, security constraints may only allow exchanges of data to occur if the data satisfies similarity requirements. Thus, it is crucial to know whether tensors maintained between the processes are similar enough before actually sending the tensors from a first server or processor, to a second server or processor. Avoiding the compression, communication, and decompression steps save significantly on computation/communication resources. Enabling processes to decide on revealing (or not) their tensors to other processes based on similarity criteria increases data security of the overall system.

As an example, a DML application has local nodes used to train a Global Machine learning (GML) model using local data. The local nodes are distributed across a network of servers and processors and are remote from each other. During training the nodes need to exchange tensors which contain model parameters using network communication resources. For the example, the tensors are $n_1 \times n_2$ arrays and all nodes transform their tensors to vectors of dimension $d = n_1 \times n_2$. During a training iteration, communications resources are conserved if a sender node sends its vector $\vec{a}$, of dimension d (the number of model parameters), only if it is substantially different than the current vector $\vec{b}$ at the receiver node. In order to compare the vectors, the sender could receive $\vec{b}$, compute the length of the vector difference $c=|\vec{a}-\vec{b}|$ locally and then decide to send $\vec{a}$, based on a relative tolerance threshold. However, this approach defies the original intention, since an entire vector would then be communicated between servers, d×m bits in total, where m is the "word" length in bits, typically 32 or 64 (single or double precision). Further, the entire vector $\vec{b}$, would be shared and therefore exposed.

Disclosed systems and methods enable determinations of whether two tensor objects, on two separate processes running in remote machines, are approximately "close" (or similar) without sharing the tensor objects. In an embodiment, the invention works by vectorizing the tensor objects, encoding each resulting vector as a (length, angle) pair, where angle is computed using a locality sensitive hashing (LSH) technique, and sharing and comparing the encoded vectors instead of the original tensor objects. The disclosed methods save substantially on communication overhead and allow the processes to control sharing of their tensors with other processes based on tensor similarity criteria.

Disclosed systems and methods are applicable to general networked computing environments and are particularly applicable to DML system environments having nodes distributed across a networked environment executing multi-node algorithms in increase processing performance.

In an embodiment, the method uses k bits, with k being much less than dxm, to approximate how close two vectors (and their associated original tensors) are without actually sharing any of the vectors between these two communicating agents. In this embodiment, the method determines if two remote tensors are approximately "close" without transmitting any of them. This method works by first obtaining vectorized versions of the tensors. Then the resulting vectors are encoded as (length, angle) pairs, where lengths are real numbers representing the magnitude of the vector and angle is a k-bit vector hash representing the angle of the vector.

In this embodiment, the angle of each vector is computed using a locality sensitive hashing technique. To approximate the angle θ between vectors $\vec{a}$ and $\vec{b}$, (binary) sign vectors $\vec{s}_a$ and $\vec{s}_b$ are computed for each of vector $\vec{a}$ and $\vec{b}$. The length of a vector and its sign vector representing the angle are the only information transmitted in this similarity comparison approach. This information is a small fraction of the original tensors (therefore reducing drastically communication overhead) and also reveals minimal information about the original tensors (therefore applicable to applications with security constraints related to sharing or not based on similarity).

By exchanging and comparing the vector lengths and angles, the processes are able to determine whether or not the original tensors are (approximately) similar, and the sender can decide on whether or not to send its tensor to the receiver.

In an embodiment, application of the disclosed methods are applicable to distributed iterative algorithms that are particularly stable under perturbations. Examples include those algorithms that mostly retain their convergence properties when ported to a totally (or partially) asynchronous computation model. Disclosed methods are applicable to each pair of communicating agents, to each iteration, especially towards the later stages of the algorithm when convergence could be assumed to increase the probability of vectors being "close".

In an embodiment, disclosed embodiments are applicable to learning algorithms based on stochastic approximation. As an example, the stochastic gradient descent (SGD) variants, typically trained on mini-batches, are in general robust to input data "perturbations" like resizing or shuffling. This implies that stochasticity could also be much more "forgiving", in terms of sensitivity, when relaxing and approximating notions like distance (for "closeness"), as compared to other traditional methods with more deterministic data flows when small input deviations could lead to irrevocable instabilities. Methods have further applicability in communicating large vectors. Here the assumption is that the size d of the real vector to be communicated is much larger than the size k of the encoding bit vector. The disclosed methods may be applied to trained models, which are commonly represented as matrices, which can be vectorized during application of the methods. In an embodiment, disclosed methods increase application speeds by reducing communication loadings and further increase data security by reducing data sharing needs.

Aspects of the invention disclose methods, systems and computer readable media associated with tensor comparison across a network by determining a first parameter of a first vector representation of a first tensor object associated with a first processor, receiving a second parameter associated with a second vector representation of a second tensor object associated with a second processor, determining a third parameter of the first vector representation of the first tensor object, receiving a fourth parameter associated with the second vector representation of the second tensor object, determining a difference between the first vector representation and the second vector representation according to the first, second, third, and fourth parameters and sending the first vector representation from the first processor to the second processor, according to the difference.

For the following description of the disclosed inventions, the discussion focuses upon the communications and interactions between a sender process (sender) and a receiver process (receiver). Each of the sender and receiver processes constitutes a process application running on a portion of a distributed computing environment. Each process is running upon a different portion of the environment and the processes are communicating over a network communication system.

In an embodiment, the sender possesses a tensor $X_a$, and the receiver possesses tensor $X_b$. At the outset of the progression of the method, the sender transforms Xa to a vector $\vec{a}$, the receiver transforms Xb, to vector $\vec{b}$. Each vector provides a representation of the information contained in the respective tensor. In this embodiment, the sender computes a length parameter a for its vector and requests a length parameter b associated with $\vec{b}$ from the receiver. The receiver determines b for $\vec{b}$, and sends b to the sender in response to the request.

The sender determines an absolute difference between a and b and compares the difference to a pre-defined threshold value. In an embodiment, the method seeks to avoid sending similar tensors and the method proceeds to send tensors having a determined difference greater than the pre-defined threshold value.

Tensors $X_a$, and $X_b$, may have similar lengths a and b, and yet be dissimilar enough to justify sending $\vec{a}$. To capture such instances and send the dissimilar tensors, the method conducts an additional similarity test for those vectors having length differences less than the pre-defined threshold. For this similarity test, the sender generates k random vectors $r_1, r_2, r_3, \ldots r_k$, using a seed value s, for initializing its pseudorandom number generator. For each random vector, the sender computes the sign (positive or negative) of dot product of the random vector and $\vec{a}$. The sender collects the computed dot product signs, as sender k-bit sign vector $\vec{s_a}$. The receiver also generates k random vectors $r_1, r_2, r_3, \ldots r_k$, using seed value s, for initializing its pseudorandom generator. The receiver also computes the sign of dot products of the random vectors and $\vec{b}$. The receiver collects the computed dot product signs, as receiver k-bit sign vector $\vec{s_b}$, and sends b and vector $\vec{s_b}$ to the sender. In an embodiment, the sender provides the receiver with s and k, for use in computing vector $\vec{s_b}$. As an alternative, each of the sender and receiver possesses pre-defined values for each of s and k, for these computations.

In an embodiment, k, s, and threshold values are statically fixed and their values may relate to the specific applications utilizing the tensor comparisons as well as computing resources, budgetary and other constraints. Increasing k will result in better approximations at the expense of computation overhead—more randomized projections. Increasing threshold values will affect the number of iterations where the method skips point-to-point communications and thus the utility of the method in reducing communications resource usage.

The sender estimates the probability p of identical signs for the two vectors $\vec{a}$ and $\vec{b}$ by elementwise counting the relative number of identical entries in $\vec{s_a}$ and $\vec{s_b}$. Given p, the method estimates the approximate angle θ between the two vectors using the equation $p=1-\theta/\pi$. Equipped with the approximate angle θ, the length b of $\vec{b}$ and the length a of $\vec{a}$, the sender can now approximate the length of the vector difference $c=|\vec{c}|=|\vec{a}-\vec{b}|$ by the law of cosines: $c=\sqrt{a^2+b^2-2ab\cos\theta}$.

If relative vector difference c/a is larger than a tolerance threshold r, then the sender sends its a to the receiver; otherwise it skips this communication. In an embodiment, the receiver is notified about the skip through the execution of a communications timeout between nodes (processors) or by the sender sending of an explicit skipped tensor communication message, indicating that no tensor was, or will be, sent, to the receiver.

In an embodiment, the sender and receiver each compute the length and sign vectors, using seed s and k, for their respective vector representations as described above. In this embodiment, the sender requests and receives from the receiver, b, and the sign vector $\vec{s_b}$. The sender determines the difference between the two vectors and either sends $\vec{a}$ to the receiver or skips the communication. In an embodiment, the sender seeks to avoid sending dissimilar tensors and only sends $\vec{a}$ when c/a is less than a defined threshold r. In an embodiment, the sender seeks to avoid sending similar tensors and sends $\vec{a}$ when c/a exceeds threshold r.

Communication of the full vector requires transmission of d×m bits. In an embodiment, the method compares tensors using only 3×m+k bits. In an embodiment, where the number of projections k, and a seed value are pre-specified and not shared for each comparison, the comparison process requires communication of only m+k bits.

Figure 1:
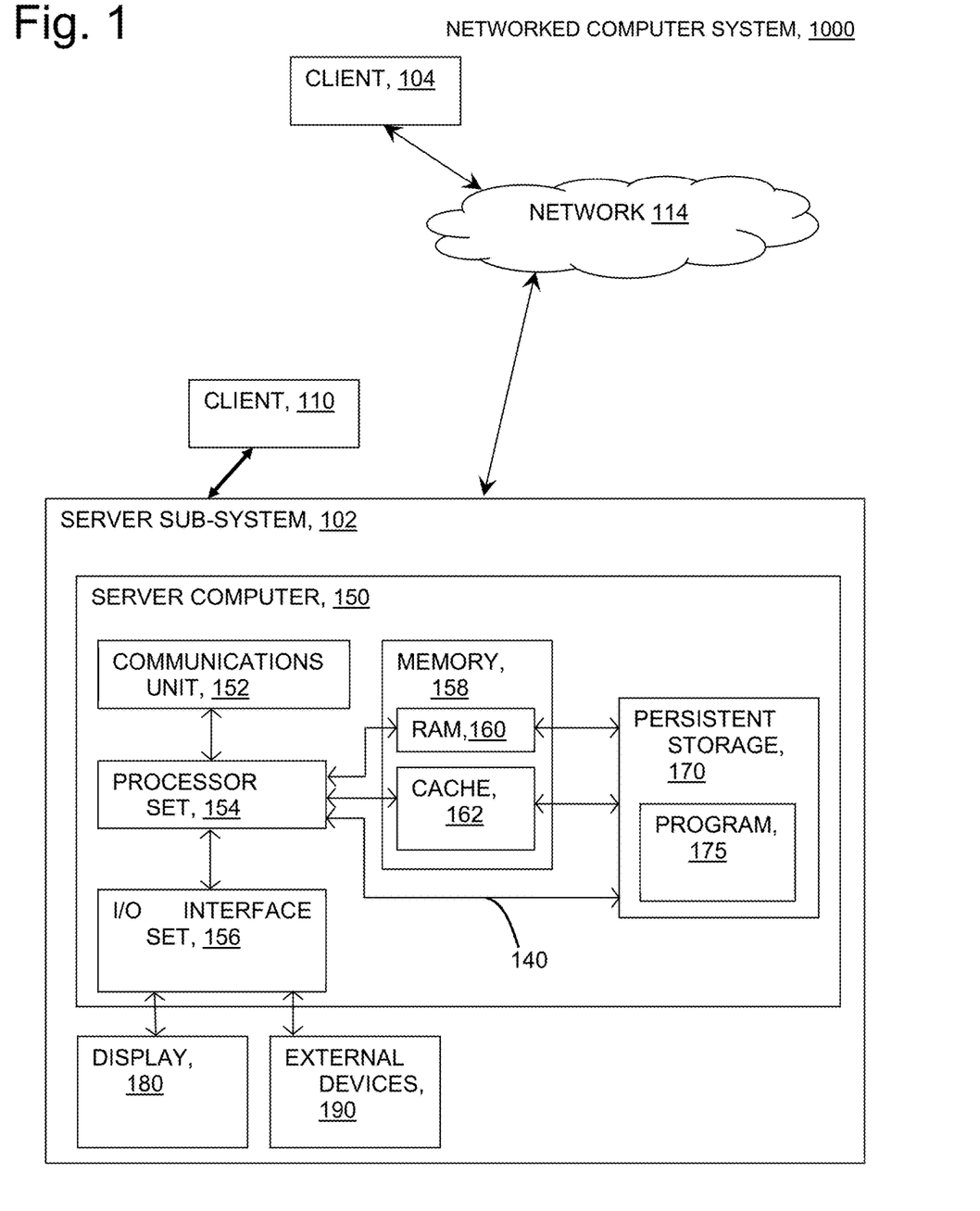
FIG. 1 provides a schematic illustration of a computing environment according to an embodiment of the invention.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 include tensor comparison program (not shown) together with sufficient computing resource (processor, memory, network communications hardware) to execute the program. In an embodiment, client device 104 and 110, and server sub-system 102, constitute portions of a distributed machine learning system, where the training of the machine learning model includes the transfer of tensor objects between resources as model training progresses.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the tensor comparison program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., tensor comparison program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
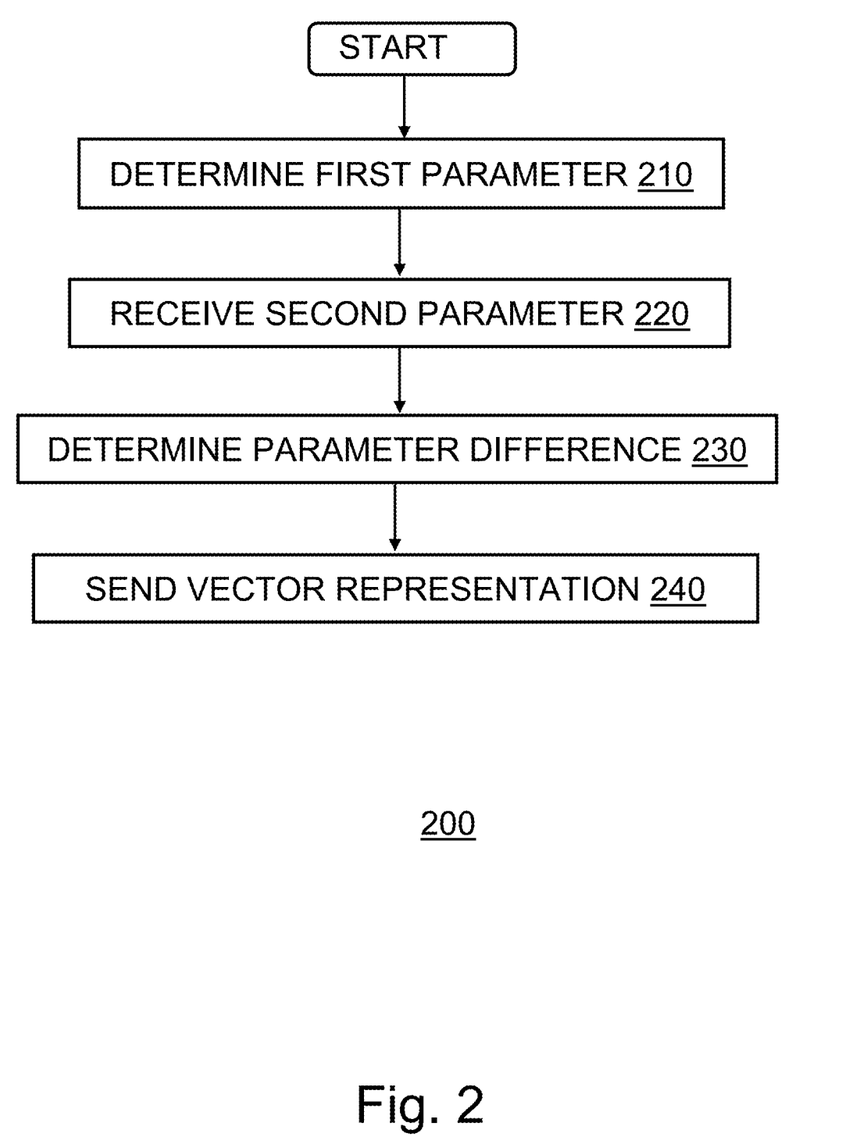
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of tensor comparison program 175 determines a first parameter value associated with a vector representation of a tensor held by a sending process. In an embodiment, the first parameter value constitutes a length of the vector representation. The method generates the first parameter value as part of method execution by the sending process operating upon a networked computing processor.

At block 220, the method of tensor comparison program 175, receives a second parameter. A receiving process, operating upon a second networked computing processor, determines the second parameter in association with a second vector representation of a second tensor accessed by the receiving process, the first and second parameters each representing the same parameter of their respective associated vector representations. For example, each parameter may provide a determined length of the corresponding vector representation. The receiving process provides the second parameter to the sending process in response to a request for the second parameter from the sending process.

At block 230, the sending process compares the first and second parameters; in one embodiment the comparison includes determining the absolute value of the difference between the two parameters.

At block 240, the sending process sends the vector representation of the tensor to the receiving process over the network. In an embodiment, the sending process evaluates the determined parameter difference against a defined threshold and sends the vector only when the correct relationship between the difference and the threshold exists—e.g., the difference falls above or below the threshold as required. In an embodiment, sending only occurs when the difference exceeds the threshold, while in another embodiment, sending only occurs when the difference falls below the threshold. For instance, where the difference does not satisfy the threshold requirement, the method does not send the vector. In an embodiment, the sender provides notice of the threshold failure while in another embodiment, the sender remains silent in view of the threshold failure.

Figure 3:
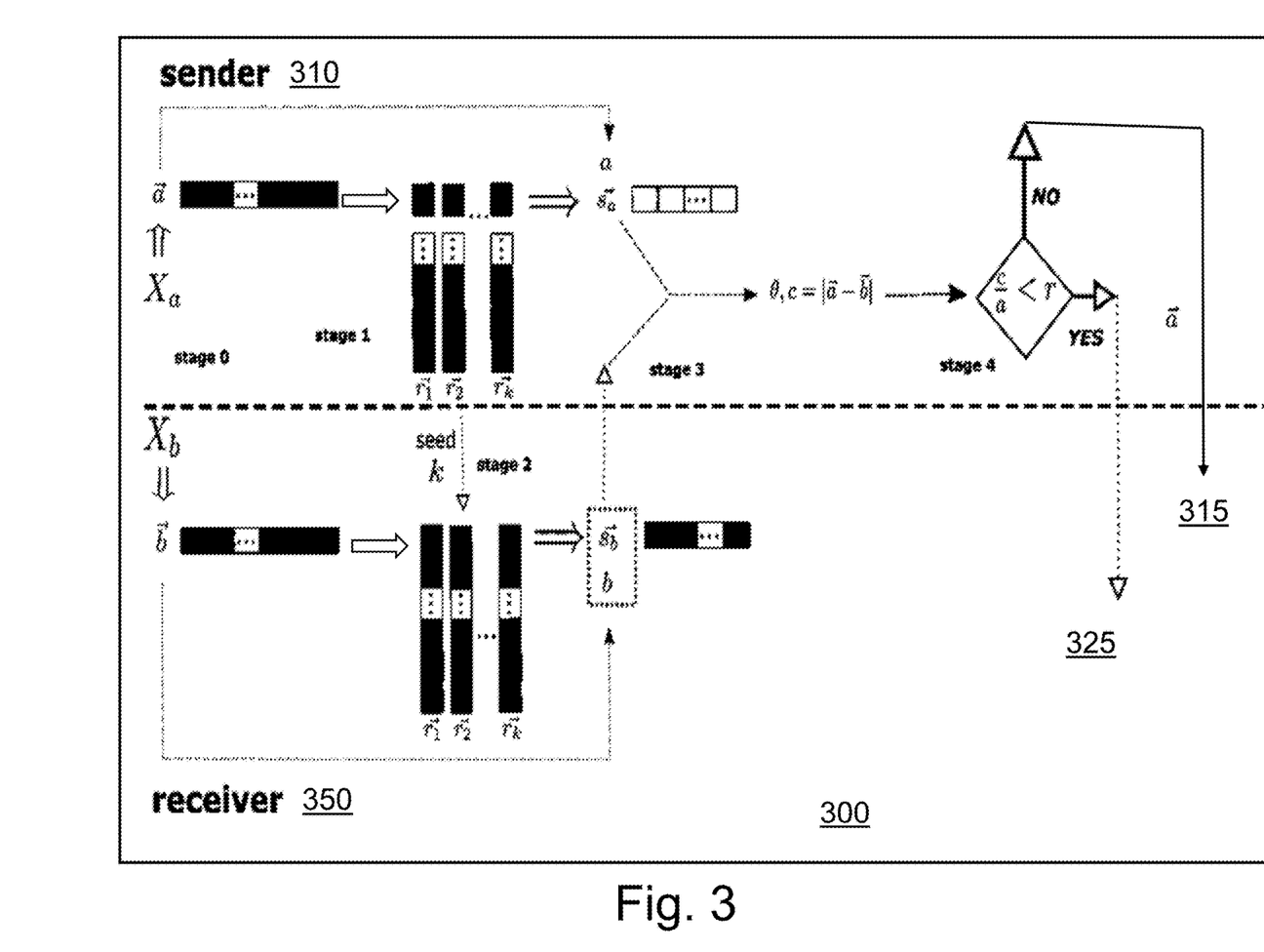
FIG. 3 provides a schematic depiction of data flow, according to an embodiment of the invention.

FIG. 3 illustrates data flow 300 across a networked system according to an embodiment of the invention. As shown in the Figure, at stage 0, each of sender 310 and receiver 350 transforms a tensor to a vector representation $X_a$, $X_b$, to vectors $\vec{a}$, and $\vec{b}$. Each of sender 310 and receiver 350 determines a length parameter a, b, for their vector. At stage 1, sender 310 generates k, random vectors from a seed value s. Sender 310 computes a sign vector $\vec{s}_a$ according to the sign of the dot product of each of the k random vector with $\vec{a}$. The determined length and sign vector are considered the comparison signature of the vector $\vec{a}$.

At stage 2, sender 310 provides receiver 350, k and s, and receiver 50 utilizes k and s, similarly to sender 310, to determine $\vec{s}_b$. Receiver 350 provides the comparison signature b, and to sender 310, in response to a request for the comparison signature from sender 310.

At stage 3, sender 310 compares the two comparison signatures to determine a difference between vectors $\vec{a}$, and $\vec{b}$. The comparison includes determining an angle between the two vectors according to the respective sign vectors.

At stage 4, the sender compares the determined difference between the vectors to a defined threshold to determine if vector $\vec{a}$ should be sent to receiver 350. In an embodiment, at 315 vectors having a difference greater than the threshold r, indicating dissimilar vectors, are sent. In an alternative embodiment, at 325, vectors having a difference less than r, similar vectors, are sent.

Figure 4:
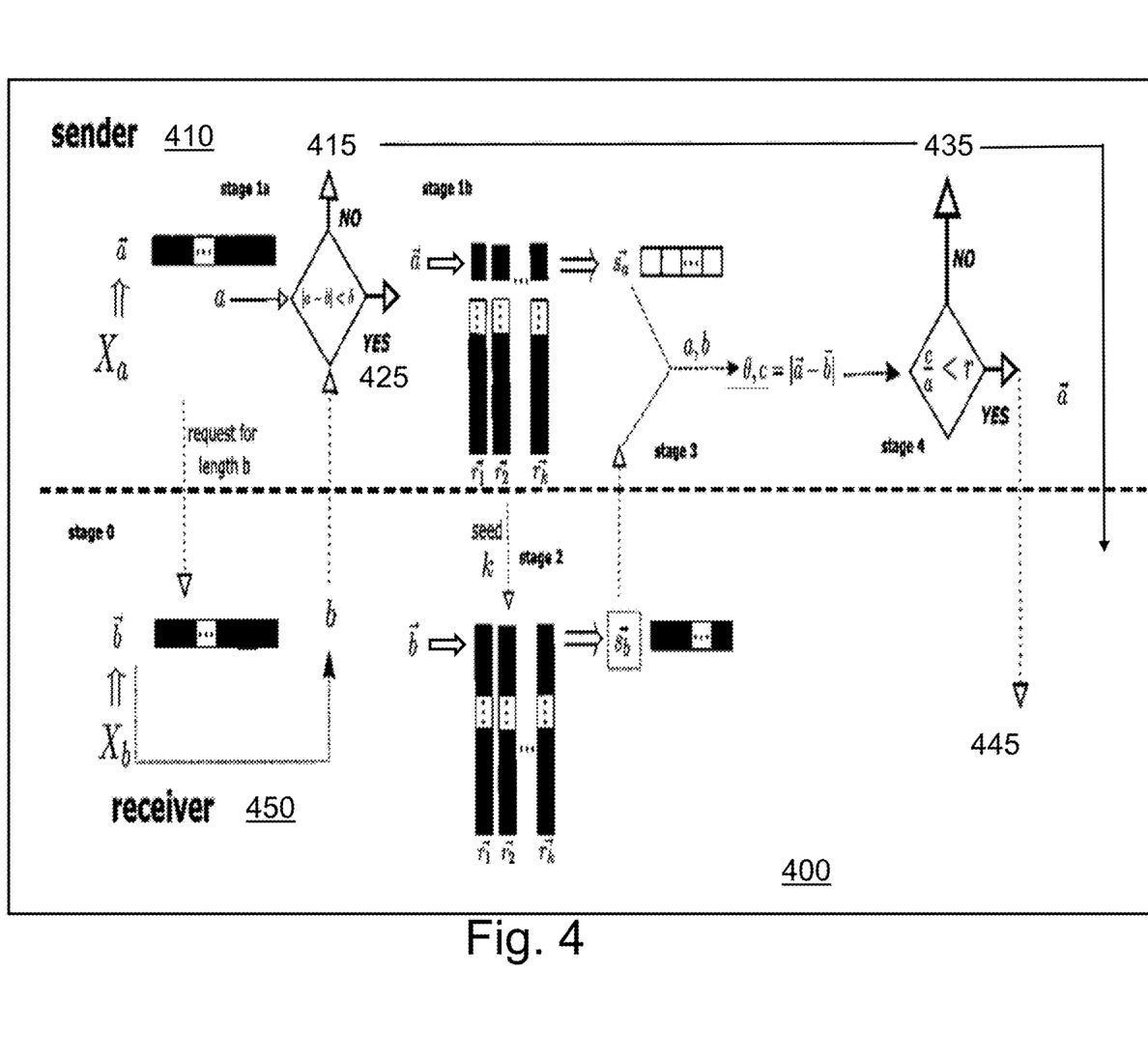
FIG. 4 provides a schematic depiction of data flow, according to an embodiment of the invention.

FIG. 4 illustrates data flow 400, across a networked system according to an embodiment of the invention. As shown in the figure, at stage 0, each of sender 410 and receiver 450 transforms a tensor to a vector representation $X_a$, $X_b$, to vectors $\vec{a}$, and $\vec{b}$. Each of sender 410 and receiver 450 determines a length parameter a, b, for their vector. At stage 1a, sender 410 requests length b, from receiver 450. Receiver 450 provides b and sender 410 compares a and b. At 415, sender 410 sends $\vec{a}$ to receiver after determining that the difference between a and b exceeds a threshold value. At 425, sender proceeds to step 1b after determining that the difference between a and b is less than the threshold.

At stage 1b, sender 410 generates k, random vectors from a seed value s. Sender 410 computes a sign vector $\vec{s}_a$ according to the sign of the dot product of each of the k random vector with $\vec{a}$. The determined length and sign vector are considered the comparison signature of the vector $\vec{a}$.

At stage 2, sender 410 provides receiver 450, k and s, and receiver 450 utilizes k and s, similarly to sender 410, to determine $\vec{s}_b$. Receiver 450 provides the comparison signature b, and $\vec{s}_b$, to sender 410, in response to a request for the comparison signature from sender 410.

At stage 3, sender 410 compares the two comparison signatures to determine a difference between vectors $\vec{a}$, and $\vec{b}$. The comparison includes determining an angle between the two vectors according to the respective sign vectors.

At stage 4, sender 410 compares the determined difference between the vectors to a defined threshold to determine if vector $\vec{a}$ should be sent to receiver 450. In an embodiment, at 435, vectors having a relative difference greater than the threshold r, indicating dissimilar vectors, are sent. In an alternative embodiment, at 445, vectors having a relative difference less than r, similar vectors, are sent.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
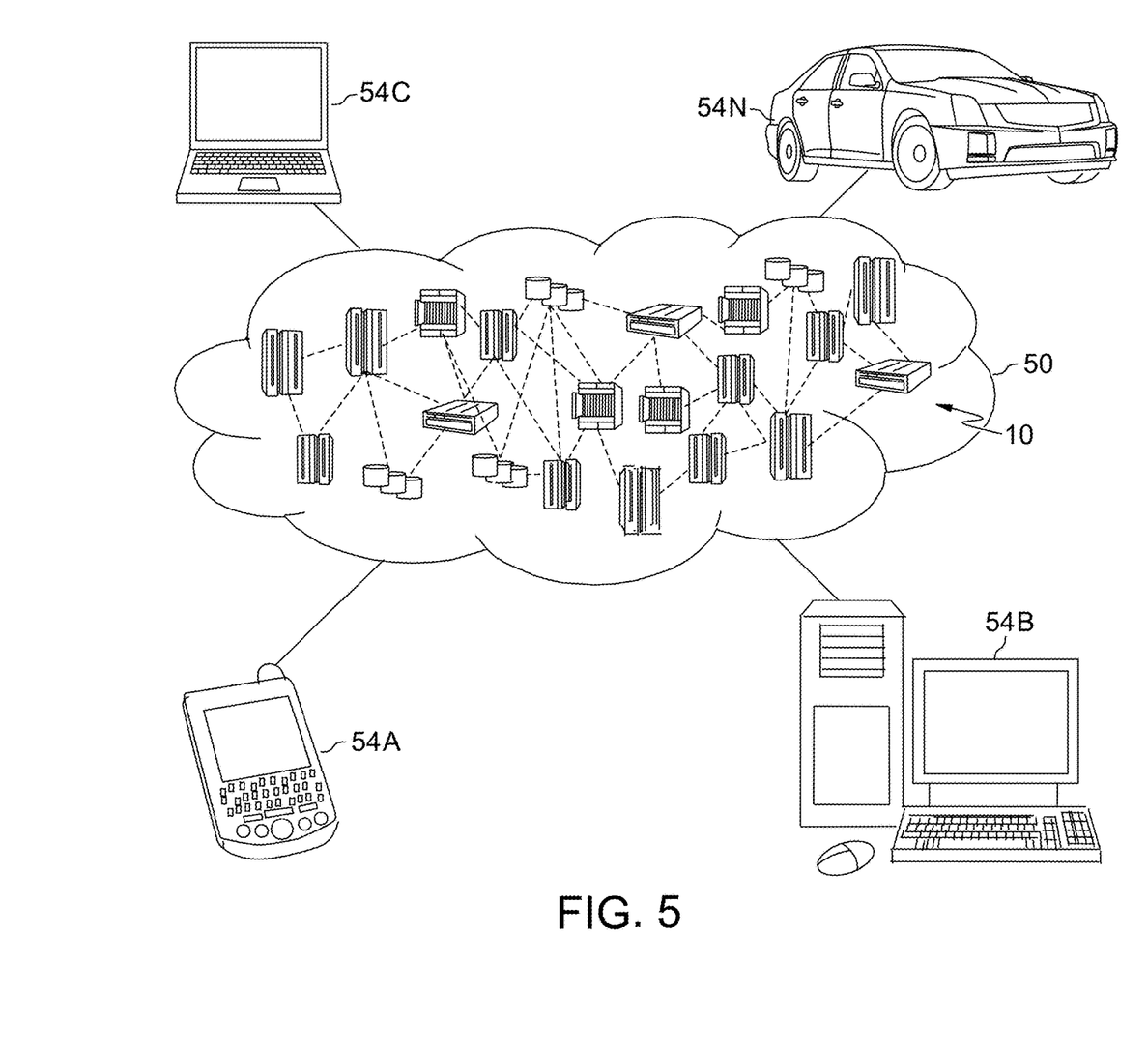
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
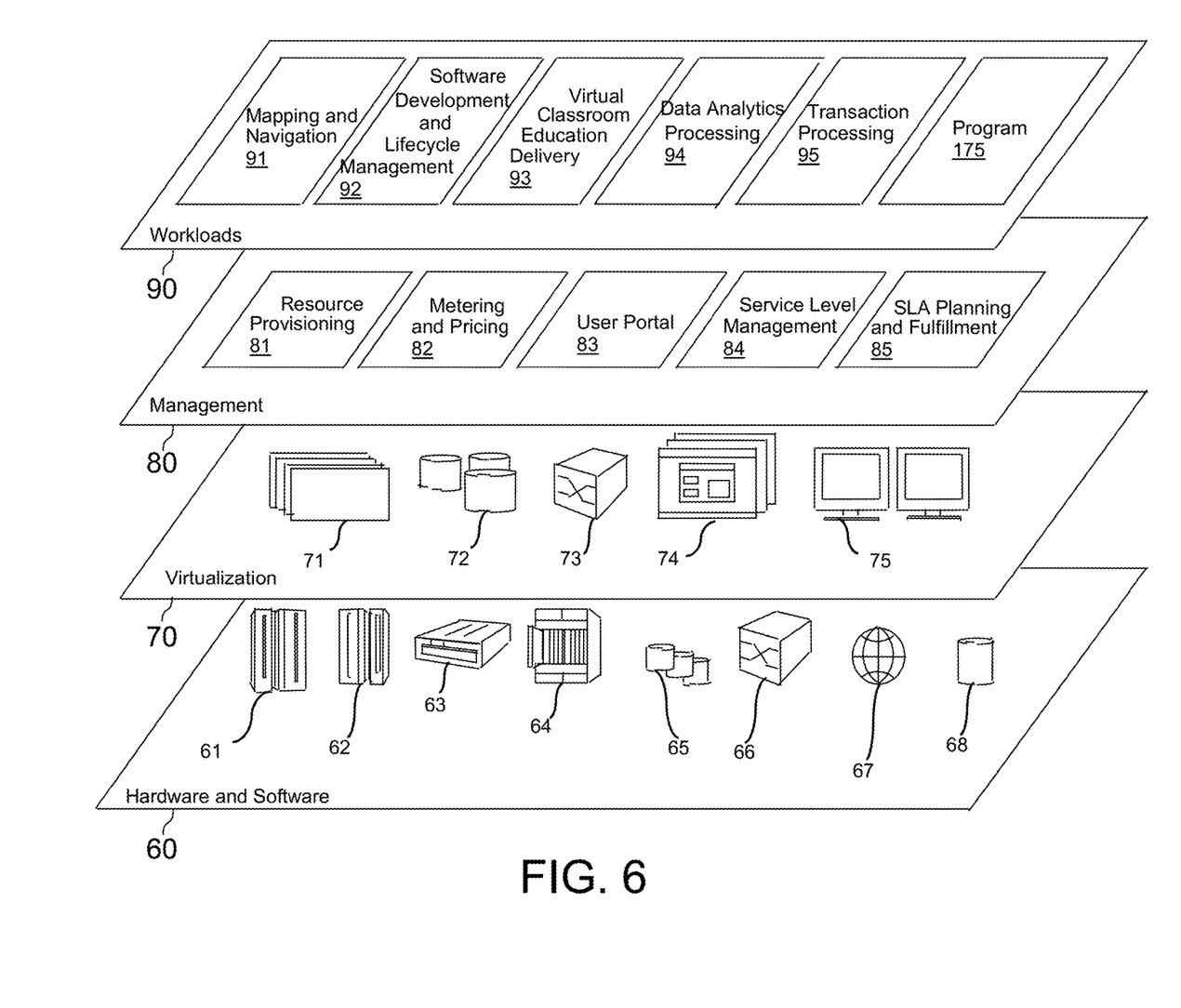
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tensor comparison program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for tensor comparison across a network, the method comprising:
   determining, by one or more computer processors, a first parameter of a first vector representation of a first tensor object associated with a first processor;
   receiving, by the one or more computer processors, a second parameter associated with a second vector representation of a second tensor object associated with a second processor;
   determining, by the one or more computer processors, a first difference value between the first parameter and the second parameter; and
   sending, by the one or more computer processors, the first vector representation from the first processor to the second processor, according to the first difference value relative to a first threshold.

2. The computer implemented method according to claim 1, further comprising:
   determining, by the one or more computer processors, a third parameter of the first vector representation of the first tensor object;
   receiving, by the one or more computer processors, a fourth parameter associated with the second vector representation of the second tensor object;
   determining, by the one or more computer processors, a second difference value between the first vector representation and the second vector representation according to the first parameter, second parameter, third parameter, and fourth parameters; and
   wherein sending, by the one or more computer processors, the first vector representation from the first processor to the second processor, is further performed according to the second difference value relative to a second threshold.

3. The computer implemented method according to claim 2, further comprising:
   wherein determining, by the one or more computer processors, the third parameter is further performed according to a seed value; and
   wherein the fourth parameter is further determined, by the one or more computer processors, according to the seed value.

4. The computer implemented method according to claim 2, wherein the third parameter comprises a sign vector associated with the first vector representation and wherein the fourth parameter comprises a sign vector associated with the second vector representation.

5. The computer implemented method according to claim 2, further comprising sending, by the one or more computer processors, an explicit "no tensor sent" message from the first processor to the second processor, according to the second difference value relative to the second threshold.

6. The computer implemented method according to claim 2, further comprising executing, by the one or more computer processors, a communication timeout between the first processor to the second processor, according to the second difference value relative to the second threshold.

7. The computer implemented method according to claim 1, wherein the first parameter comprises a length of the first vector representation and wherein the second parameter comprises a length of the second vector representation.

8. A computer program product for tensor comparison across a network, the computer program product comprising one or more computer readable storage devices and collectively stored program instructions on the one or more computer readable storage devices, the stored program instructions comprising:
program instructions to determine a first parameter of a first vector representation of a first tensor object, associated with a first processor;
program instructions to receive a second parameter associated with a second vector representation of a second tensor object, associated with a second processor;
program instructions to determine a first difference between the first parameter and the second parameter; and
program instructions to send the first vector representation from the first processor to the second processor, according to the first difference value relative to a first threshold.

9. The computer program product according to claim 8, the stored program instructions further comprising:
program instructions to determine a third parameter of the first vector representation of the first tensor object;
program instructions to receive a fourth parameter associated with the second vector representation of the second tensor object;
program instructions to determine a second difference value between the first vector representation and the second vector representation according to the first parameter, second parameter, third parameter, and fourth parameters; and
wherein sending the first vector representation from the first processor to the second processor, is further performed according to the second difference value relative to a second threshold.

10. The computer program product according to claim 9, wherein determining the third parameter is further performed according to a seed value; and wherein the fourth parameter is further determined according to the seed value.

11. The computer program product according to claim 9, wherein the third parameter comprises a sign vector associated with the first vector representation and wherein the fourth parameter comprises a sign vector associated with the second vector representation.

12. The computer program product according to claim 9, the stored program instructions further comprising program instructions to send a "no tensor sent" message from the first processor to the second processor, according to the second difference value relative to the second threshold.

13. The computer program product according to claim 9, the stored program instructions further comprising program instructions to execute a communication timeout between the first processor to the second processor, according to the second difference value relative to the second threshold.

14. The computer program product according to claim 8, wherein the first parameter comprises a length of the first vector representation and wherein the second parameter comprises a length of the second vector representation.

15. A computer system for tensor comparison across a network, the computer system comprising:
one or more computer processors;
one or more computer readable storage devices; and
stored program instructions on the one or more computer readable storage devices for execution by the one or more computer processors, the stored program instructions comprising:
program instructions to determine a first parameter of a first vector representation of a first tensor object, associated with a first processor;
program instructions to receive a second parameter associated with a second vector representation of a second tensor object, associated with a second processor;
program instructions to determine a first difference between the first parameter and the second parameter; and
program instructions to send the first vector representation from the first processor to the second processor, according to the first difference value relative to a first threshold.

16. The computer system according to claim 15, the stored program instructions further comprising:
program instructions to determine a third parameter of the first vector representation of the first tensor object;
program instructions to receive a fourth parameter associated with the second vector representation of the second tensor object;
program instructions to determine a second difference value between the first vector representation and the second vector representation according to the first parameter, second parameter, third parameter, and fourth parameters; and
wherein sending the first vector representation from the first processor to the second processor, is further performed according to the second difference value relative to a second threshold.

17. The computer system according to claim 16, wherein determining the third parameter is further performed according to a seed value; and wherein the fourth parameter is further determined according to the seed value.

18. The computer system according to claim 16, wherein the third parameter comprises a sign vector associated with the first vector representation and wherein the fourth parameter comprises a sign vector associated with the second vector representation.

19. The computer system according to claim 16, the stored program instructions further comprising program instructions to send a "no tensor sent" message from the first processor to the second processor, according to the second difference value relative to the second threshold.

20. The computer system according to claim 16, the stored program instructions further comprising program instructions to execute a communication timeout between the first processor to the second processor, according to the second difference value relative to the second threshold.

* * * * *